(12) United States Patent
Thierer et al.

(10) Patent No.: US 8,635,110 B2
(45) Date of Patent: Jan. 21, 2014

(54) CENTRALIZED MANAGEMENT OF MARKETING ACTIVITIES AMONG PARTICIPANTS OF MULTIPLE CHANNEL MARKETING NETWORKS

(75) Inventors: Nasrin S. Thierer, Barrington, IL (US); Kevin M. Souers, Chicago, IL (US)

(73) Assignee: Revenew Systems, LLC., Palatine, IL (US)

( * ) Notice: Subject to any disclaimer, the term of this patent is extended or adjusted under 35 U.S.C. 154(b) by 189 days.

(21) Appl. No.: 13/210,010

(22) Filed: Aug. 15, 2011

(65) Prior Publication Data

US 2013/0046640 A1 Feb. 21, 2013

(51) Int. Cl.
*G06Q 30/00* (2012.01)

(52) U.S. Cl.
USPC ...... 705/14.69; 705/7.11; 705/7.12; 705/7.13

(58) Field of Classification Search
USPC ............................. 705/14.69, 7.11, 7.12, 7.13
See application file for complete search history.

(56) References Cited

U.S. PATENT DOCUMENTS

| | | |
|---|---|---|
| 6,335,927 B1 | 1/2002 | Elliott et al. |
| 6,606,744 B1 | 8/2003 | Mikurak |
| 2005/0004837 A1 | 1/2005 | Sweeney et al. |
| 2009/0125402 A1 | 5/2009 | Voltmer et al. |

OTHER PUBLICATIONS

International Search Report and Written Opinion from related International application No. PCT/US2012/46133 dated Sep. 17, 2012.

*Primary Examiner* — Raquel Alvarez
(74) *Attorney, Agent, or Firm* — Lempia Summerfield Katz LLC

(57) ABSTRACT

A marketing system, also referred to as a platform, is disclosed which facilitates centralized management of marketing activities among multiple participants of multiple channel marketing networks, where the marketing activities may include determination of one or more consumers to which marketing content is to be presented and a provision of marketing content thereto. In particular, the disclosed technology platform allows members of a channel marketing network, including, for example, sponsors/OEMs, distributors, buying groups, and resellers, to link to each other to create connections that allow a secure and managed exchange of marketing content, funding and contact data, for the purpose of executing shared business processes, such as co-marketing related processes, and having access to the results thereof. An advertising platform is provided which facilitates participant discovery and channel network formation, segregates marketing activities between channel marketing networks and among the participants of a particular channel marketing network, generates and conducts marketing campaigns on behalf of participants based on internally generated and/or participant provided marketing content and directed to participant identified contacts, facilitates the funding of those marketing campaigns by one or more participants, and facilitates gathering and evaluation of the results thereof.

48 Claims, 3 Drawing Sheets

US 8,635,110 B2

CENTRALIZED MANAGEMENT OF MARKETING ACTIVITIES AMONG PARTICIPANTS OF MULTIPLE CHANNEL MARKETING NETWORKS

BACKGROUND

A channel of distribution, also referred to as a distribution channel, a marketing channel, a marketing channel network or a channel marketing network, may be defined as the collection of organizational units, institutions, or agencies within, external to, or inclusive of a manufacturer of products and/or services, which perform the functions that support product and/or service distribution and/or marketing, such as conducting product and/or service advertising campaigns. The marketing functions are pervasive and may include buying, selling, transporting, storing, grading, financing, bearing market risk, and providing marketing information. Any organizational unit, institution, or agency that performs or assists in the performance of one or more of the marketing functions may be a member of a channel marketing network.

Participants of a particular channel marketing network may include a sponsor, one or more intermediaries and one or more resellers. Sponsors are typically a manufacturer or other originator of products and/or services for sale to consumers and may promulgate one or more particular exclusive brands. Resellers are organizations or entities, such as retail outlets or direct sales organizations, which typically purchase, directly or indirectly, products and/or services from a sponsor with the intent to resell those products and/or services to consumers. Intermediaries may include organizations or entities, such as a distributor or reseller association, which facilitate the sale of products and/or services of one or more sponsors by one or more resellers.

In any given channel marketing network, each participant may have an interest in marketing, e.g. conducting advertising campaigns for, the particular products and/or services of a particular sponsor, to facilitate sales to consumers and generation of revenue. Further, sponsor participants may be interested in coordinating with, or otherwise helping, other participants, e.g. intermediary and/or reseller participants, to conduct advertising campaigns as well as to manage those campaigns to ensure, for example, consistent brand presentation, avoidance of activities detrimental to the brand, ensure fair opportunities among participants and generally minimize inefficiencies in the marketing and sales process.

DETAILED DESCRIPTION OF THE DRAWINGS AND PRESENTLY PREFERRED EMBODIMENTS

Figure 1:
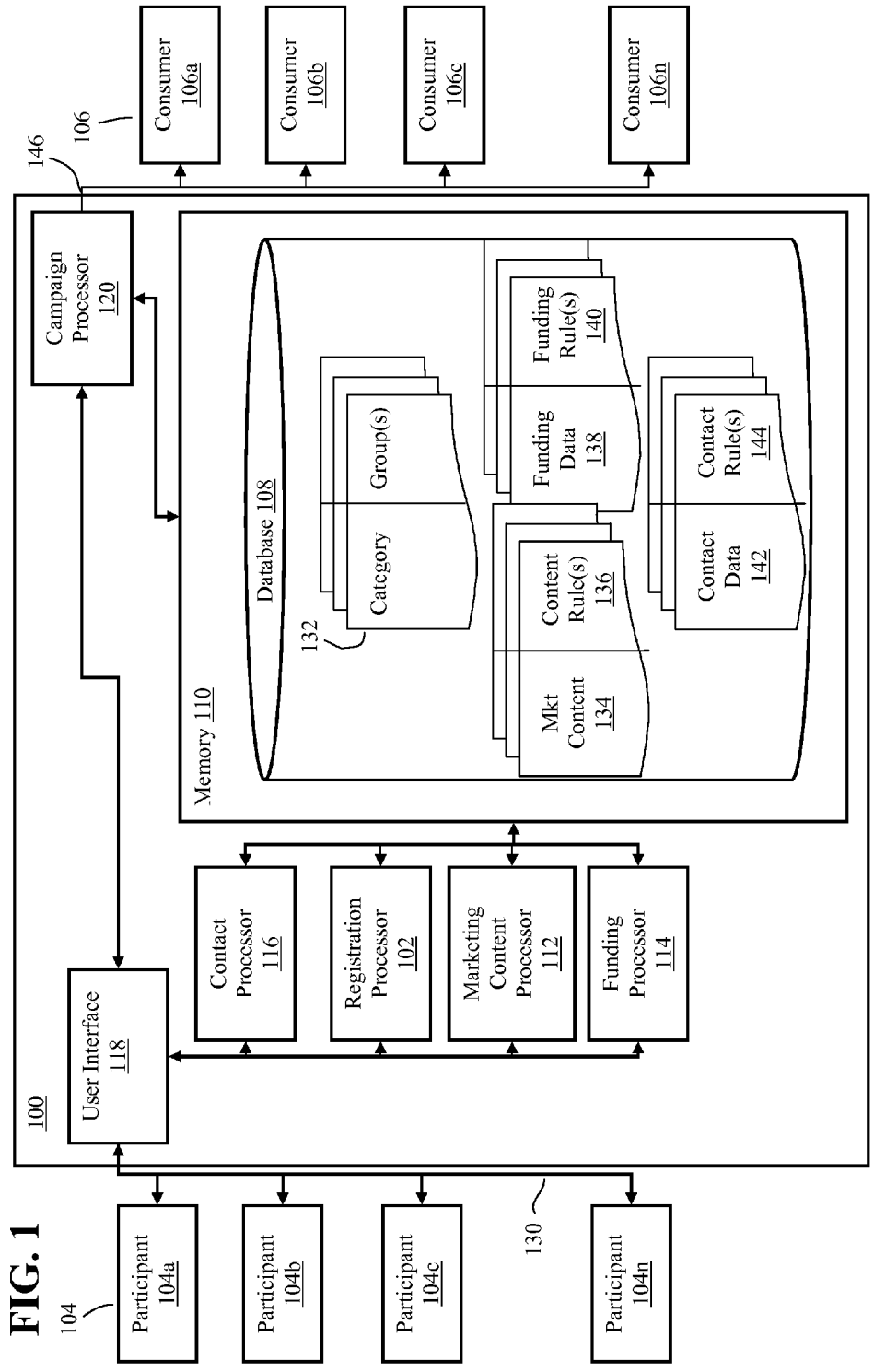
FIG. 1 depicts a block diagram of a marketing system 100, according to one embodiment.

The disclosed embodiments relate to a marketing system, also referred to as a platform, which facilitates centralized management of marketing activities among multiple participants of multiple channel marketing networks, where the marketing activities may include determination of one or more consumers to which marketing content is to be presented and a provision of marketing content thereto. In particular, the disclosed embodiments relate to a technology platform that allows members of a channel marketing network, including, for example, sponsors/OEMs, distributors, buying groups, and resellers, to link to each other to create connections that allow a secure and managed exchange of marketing content, funding and contact data, for the purpose of executing shared business processes, such as co-marketing related processes, and having access to the results thereof. The disclosed embodiments provide an advertising platform which facilitates participant discovery and channel network formation, segregates marketing activities between channel marketing networks and among the participants of a particular channel marketing network, generates and conducts marketing campaigns on behalf of participants based on internally generated and/or participant provided marketing content and directed to participant identified contacts, facilitates the funding of those marketing campaigns by one or more participants, and facilitates gathering and evaluation of the results thereof.

As opposed to single-sponsor systems, the disclosed embodiments centralize marketing related processes and activities across multiple channel marketing networks comprising sponsor, intermediary and reseller participants, standardizing workflow and eliminating inconsistent and inefficient or duplicative application. Further, the disclosed embodiment enable intra- and inter-channel marketing network functionality such as support for multiple sponsors as well as overlapping or discrete channel marketing networks, real-time approvals, real-time provision of funding, co-funding of transactions, enforcement of business process constraints and rules, and marketing activity management.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

In one embodiment, the platform may be a shared instance enabling multiple channel marketing networks and syndication of marketing content, allocation and/or distribution of funds and centralized execution of marketing activities within and/or between each channel marketing network, i.e., one sponsor may connect with multiple intermediaries, such as distribution partners, and multiple resellers, one intermediary may connect with multiple sponsors and multiple resellers, and one reseller may connect with multiple sponsors and multiple distribution companies. As will be described, each connection in a particular channel marketing network may follow participant-defined rules defining the type and amount of content, data, communication, and funds that may be exchanged. The system may support thousands of inter-connected and overlapping networks—much like a social network, but rather than just connecting and communicating, the participants of the various marketing channel networks will be able to execute, e.g. in real time, business transactions and shared business processes, such as the creation, funding, coordination, execution and evaluation of marketing and advertising campaigns.

As used herein, a consumer may be an individual or organization, corporate or otherwise, which purchases or otherwise acquires products and/or services with the intent to use or consume those products and/or services, i.e. for its own use or consumption. Typically, the products and/or services are acquired from a reseller or sponsor, described in more detail below, in response to an advertising campaign advertising those products and/or services and conducted by the sponsor, intermediary and/or reseller via the disclosed embodiments as will be described.

A sponsor may be an individual or organization, corporate or otherwise, such as a company, which is a manufacturer, original equipment manufacturer ("OEM"), service provider, supplier, and/or brand that sells or otherwise originates one or more products and/or services, such as branded products or services, for sale to one or more consumers, such as through a direct or an indirect sales channel. A sponsor may rely on other independent businesses to be resellers of the sponsor's products and/or services. The resellers may receive those products and/or services directly from the sponsor, or the products and/or services may come through intermediaries such as distributors or buying groups. As will be discussed in more detail below, in one embodiment, a sponsor is interested in assisting others to market the products and/or services of the sponsor and may provide marketing content, funds, and/or contact data to its resellers, but may not receive marketing content, funds, and/or contact data from other sponsors. In particular, the disclosed embodiments enable a sponsor to syndicate marketing content, i.e. publish, supply or otherwise make marketing content available to multiple participants substantially simultaneously. Along with marketing content, funds and contact data, the sponsor can specify rules, explained in more detail below, which enable the sponsor to guide, control or otherwise coordinate the marketing activities of its channel marketing network participants. As will be further discussed, the disclosed embodiments enable a sponsor to see which of its resellers ran its sponsored advertising campaigns, and to see aggregate results of campaigns, such as how many opens, clicks, respondents, leads occurred, or overall survey results. To protect the interests of the other participants, such as resellers, the disclosed embodiments may prevent a sponsor from accessing the identities of individual leads as those may be considered proprietary to the reseller.

A reseller may be an individual, organization or business which sells products and/or services originated by another company, e.g. a sponsor, to one or more consumers, i.e. a reseller may be an entity that purchases for the intent of selling rather than consuming. A reseller may be associated with, i.e. may sell the products and/or services of, one or more sponsors and may obtain those products and/or services directly from the source sponsor or indirectly, such as via an intermediary. In one embodiment, as will be described in more detail below, a reseller may receive marketing content, funds, and/or contact data from one or more sponsors and/or intermediaries but may not provide marketing content, funds, and/or contact data to other resellers.

An intermediary may be an individual or organization, corporate or otherwise, such as a company, which may facilitate the sale or marketing of one or more products and/or services by one or more sponsors and/or resellers to one or more consumers. An intermediary may serve as an aggregator of sponsor products and/or services, i.e. a distributor, to distribute to resellers. Examples include distributors, buying associations or groups, marketing organizations, etc. In one embodiment, as will be described below, an intermediary may receive marketing content, funds, and/or contact data from one or more sponsors and may provide sponsor-provided or its own marketing content, funds, and/or contact data to one or more resellers. Intermediaries may conduct their own marketing activities and/or assist, alone or in conjunction with sponsor provided resources, others, e.g. resellers, in conducting marketing activities. For example, the disclosed embodiments may facilitate the co-funding by a sponsor and intermediary, at least partially, of the expense of a marketing campaign conducted by a reseller via the disclosed marketing system.

It will be appreciated that the characterization of an individual or organization or other entity as a consumer, sponsor, intermediary or reseller may depend upon the particular transaction undertaken by the entity and that a given entity may be characterized as being in a first category for one transaction, e.g. as a consumer, and in another category for a different transaction, e.g. as a sponsor. As such, the disclosed embodiments may be applicable to Business to Consumer ("B2C") transactions as well as Business to Business ("B2B") transactions.

In the disclosed embodiments, as will be described below, participants, e.g. individuals and/or organizations, corporate or otherwise, register with the marketing system as either being a sponsor, intermediary or reseller. As will be used herein, the terms sponsor or sponsor company, intermediary or intermediary company, and reseller or reseller company, may refer to both a category of participation in the disclosed system and to a participant registered in that category. In an alternate embodiment, a participant may be permitted to register in more than one category for the purpose of being able to participate in different transactions in different roles.

In one embodiment, a channel marketing network is a set of one or more participants who have agreed, explicitly or implicitly, to be associated for the purpose of at least conducting one or more marketing activities as will be described. A channel marketing network may include one or more sponsors alone or further include one or more intermediaries and/or one or more resellers. While a channel marketing network may include any combination of sponsors, intermediaries and resellers, in one embodiment a channel marketing network will always have at least one sponsor or intermediary, which may be considered to own or otherwise control, direct or manage the network, and at least one reseller. The channel marketing network may further include one or more intermediaries. In one embodiment, a sponsor or intermediary may invite and/or approve other participants, registered or non-registered, to enable them to register with the marketing system and/or join the sponsor's or intermediary's network. Alternatively, or in addition thereto, participants may be permitted to discover and join networks at their discretion, such as by viewing a list of available sponsors, intermediaries and or channel marketing networks. In one embodiment, sponsors and/or intermediaries may limit the visibility or otherwise constrain the availability of their channel marketing networks to only those participants meeting specified criteria, such as specific identity, type or location. In this way, sponsors and/or intermediaries may make their channel marketing networks available to specific participants without having to first identify and invite those participants to join, or otherwise deny access to participants they wish to avoid without having to specifically disapprove of their joining a particular channel marketing network.

As will be described in more detail below, channel marketing networks may be defined within the marketing system as groups to which participants belong. A participant wishing to implement a channel marketing network defines the group and either invites other participants to join and/or makes the group available to other participants, or specified subsets thereof, to join, with or without approval of the initiating participant. In one implementation, the group is characterized by one or more permissions which define the criteria for participation. The marketing system mediates invitations, requests and/or approvals according to the specified criteria, if any, to associate participants with a given channel marketing network in accordance therewith. In one embodiment, the marketing system may maintain a database storing records for each participant wherein each record identifies the channel marketing networks to which the particular participant belongs. Alternatively, or in addition thereto, channel marketing groups may be defined by inter-participant associations, e.g. participant-to-participant links, wherein each connection between two or more participants may be further defined by one or more rules defining the parameters of the connection, such as constraints on data sharing, communication or specifying a common characteristic, and wherein the marketing system mediates inter-participant interaction according to the criteria. In one implementation, each participant record in the database may identify each other participant to which the particular participant is associated and/or linked and the criteria defining the parameters of the interconnection, wherein a collection of interconnected participants having particular interconnection parameters represents a channel marketing network.

Sponsors, intermediaries and resellers may belong to more than one channel marketing network and a channel marketing network of one sponsor, i.e. the set of participants, may or may not overlap the channel marketing network of another sponsor. For example, a sponsor may have more than one channel marketing network so as to segregate groups of participants, such as particular types of resellers. As will be described, marketing content, funding and contact data may be provided by a participant subject to rules specified by the participant as to how the marketing content, funding and/or contact data may be distributed to or used by members of the participant's channel marketing network. The disclosed system enforces the specified rules enabling segregation of marketing activities between, and control of marketing activities within, channel marketing networks. In one embodiment, a channel marketing network may consist of a single sponsor which wishes to use the marketing system to market its own products and/or services as described herein. In one implementation, this sponsor may be registered as a reseller in the marketing system wherein the marketing system itself is registered as a sponsor thereto, in particular wherein the marketing system is producing marketing content therefore.

Marketing content includes advertisements and other collateral, such as images, animation, video and/or descriptive text, relating to one or more products and/or services offered by a sponsor and may describe the products and/or services, as well as discounts, promotions and/or offers related thereto. Marketing content may be in a form applicable to distribution via one or more media formats, such as postal mail, electronic mail, Internet/web based advertising, telemarketing, or combinations thereof. Further, marketing content may be at least partially customizable, such as to allow the inclusion of the name of an intermediary or reseller from which the products and/or services may be obtained by a consumer, and/or to direct the advertisement's message to the specific consumer to which it is presented. In one embodiment, marketing content may merely specify the parameters of a desired promotion, such as the subject product and a specification of a discount offer, where the marketing system is engaged to produce the advertisement, e.g. descriptive text, images, etc., for subsequent distribution. As will be described, marketing content is typically provided by a sponsor or intermediary to the marketing system and made available to their associated channel marketing network, e.g. associated resellers, to be used to execute advertising campaigns via the marketing system.

Marketing content, funding and contact data may all be provided subject to rules which govern the use of the content, funding or contact data. The rules, which are enforced by the marketing system, enable the provider of the marketing content, funding data or contact data, to control the use thereof to ensure that their business goals are achieved. As will be described, rules may be specified to generally limit which participants may have access to the marketing content, funding and contact data, as well as the extent of such access.

In one embodiment, marketing content may be provided, i.e. made available or syndicated, such as to a particular channel marketing network, subject to content rules which specify, for example, a fee for use of the marketing content, the extent to which the content may be modified by a participant who wishes to use the marketing content, the duration for which the marketing content may be used, etc. For example, the content rules may restrict modifications of the marketing content to allow a reseller only to insert their name but otherwise restrict any other changes such as the addition of co-related products or services offered by an intermediary or reseller. Content rules enable the provider of the marketing content, e.g. a sponsor or intermediary, to control the use of that content and ensure use which is consistent with their marketing goals, for example, to ensure consistent brand presentation.

As discussed above, and described in more detail below, participants, such as sponsors or intermediaries, may provide marketing content or contact data to the system to be made available to other participants of the channel marketing network for the purpose running advertising campaigns via the marketing system. Such marketing content and/or contact data may be provided for free or for a fee. Further, the marketing system may charge a fee to execute a particular advertising campaign. To facilitate payment, the marketing system enables participants to provide funding data and funding rules wherein the funding data comprises funds, such as monies conveyed to an account maintained by the marketing system on behalf of the participant, or funding mechanisms such as a credit or debit card, to be used to cover the costs of acquiring marketing content and/or contact data from another participant or from the marketing system, and cover the costs of executing advertising campaigns. Further, the marketing system may permit, subject to the funding rules, a participant to provide or otherwise allocate funds to another participant to be used to acquire marketing content or contact data or otherwise execute advertising campaigns. The marketing system may maintain accounts for each participant. In one embodiment, a participant may initiate a request for funds from another participant to which the requestee may respond. Alternatively, or in addition thereto, a participant may allocate funds to other participants. In either case, funds may be provisioned subject to rules specifying how those funds may be used, such as to cover all or only a portion of the execution of an advertising campaign. For example, a sponsor may allocate funds to each of their resellers subject to the rule that the funds may only be used to cover up to half of the cost of an advertising campaign. Participants may obtain funds from multiple sources and may be permitted to combine funds from those multiple sources as specified by the funding rules associated therewith. For example, a sponsor may provide funds to cover half of the cost of an advertising campaign executed by a reseller while an intermediary provides funds to cover the remaining half. Further, funds may be allocated by one participant, such as a sponsor, to another participant, such as intermediary, for the purpose of reallocation, such as to resellers. Funding may further be specific to marketing content thereby allowing, for example, a sponsor to fund a particular advertising campaign and not others. In this way, the marketing system acts as data exchange, a financial intermediary, a market place and a service provider.

Contact data is data which identifies one or more consumers, such as by email address, telephone number, postal address, etc., to which, for example, marketing content, such as an advertisement, may be directed, such as by electronic mail, postal mail, telephone, Internet ad, or combinations thereof. Contact data may further include demographic and personal information about the consumers which may be used, for example, to further tailor or direct an advertising campaign. As used herein, a contact refers to a consumer that is a potential recipient, i.e. has yet to receive particular marketing content. A target refers to a consumer to which particular marketing content has been sent, presented or otherwise provided but not necessarily viewed or otherwise perceived. A lead refers to a consumer to which particular marketing content has been provided and which has demonstrated some form of interest or has otherwise responded to the marketing content, such as by opening a link, requesting more information or otherwise seeking to purchase the product or service advertised by the marketing content.

Contact data may be provided subject to contact rules which specify, for example, a duration for which at least a portion of the contact data identifying a subset of the one or more consumers may be exclusively accessed by any one registered participant to execute an advertising campaign, a duration for which at least a portion of the contact data identifying a subset of one or more target consumers may be exclusively accessed by any one registered participant subsequent to executing a marketing campaign to see if any of the target consumers become leads, and a duration for which at least a portion of the contact data identifying a subset of the one or more consumers may be exclusively accessed by any one registered participant subsequent to the execution of an advertising campaign to see if any leads actually purchase the product. In this way, a sponsor, for example, can segregate marketing activities among their marketing channel to segregate markets, as well as prevent duplicative marketing activities and inefficient competition among resellers. Effectively, participants can "check out" or otherwise reserve particular contacts for exclusive periods while the provider of those contact can ensure that the contacts are used, i.e. marketed to, in a timely manner.

As will be described herein, generally, registered participants may access the marketing system to form and/or join one or more channel marketing networks, identify available marketing content and cause the marketing system to execute one or more advertising campaigns on their behalf to one or more consumers. As part of the service of executing advertising campaigns, the marketing system may further obtain results of campaign, such as which targets became leads, such as by determining click-throughs, or other consumer responses. These results may then be made available, in the aggregate or in detail, to the participant who ran the advertising campaign, and may be further made available, in the aggregate or in detail, to other participants of the associated channel marketing network. Further participants, such as sponsors, may be able to monitor the activities of other participants in their channel marketing network, such as resellers, to determine, for example, how many advertising campaigns they have run and the results thereof.

Advantageously, the disclosed marketing system simplifies the formation of channel marketing networks, i.e. makes it easier for sponsors to engage their channel network partners and allows for secure exchange of information among participants of a channel marketing network, i.e. simplifies communication among the layers of the distribution channel. This enables a sponsor, for example, to more readily guide and control marketing activities and gain visibility to results and enable their channel partners to market the sponsor's brand. Other channel network participants are provided with a unified portal through to communicate with multiple sponsors, obtain marketing content and contact data, execute advertising campaigns and view the results thereof. The funding mechanisms of the disclosed system enable the channel partners to leverage sponsor resources and facilitate sponsor-funded activities by ensuring funding resources are provided or otherwise allocated in real time rather than subjecting participants to a reimbursement cycle.

In one example of the operation of the disclosed embodiments, a sponsor may have new product launch that it wants its resellers to promote. The sponsor may fund an integrated marketing campaign including three separate emails, two direct mail post cards, content for all available social media outlets, an online advertisement for local targets, and lead classification via telemarketing. 50% of resellers work through a distributor, the other 50% are house accounts. The sponsor uploads campaign elements to marketing system which then allows the sponsor's marketing team to define sequencing of each marketing element in the integrated campaign and conduct litmus testing on each element. The sponsor decides what parts of each element can be customized by the resellers. The sponsor then uploads a centralized contact database to the marketing system to distribute to resellers. The sponsor may expect resellers to market the campaign to their own target lists, but may also want to make available additional leads that had been collected centrally. The sponsor further sets campaign budgets and allocations and may elect to cap the budget per reseller, and/or set a reimbursement percentage for specific resellers, or require that dealers request approval on a campaign-by-campaign basis. The sponsor may allocate funds to resellers directly, or allocate pools of funds to distributors for them to allocate to individual resellers. If pooled funds given to an intermediary for reallocation, such as distributor, the intermediary is notified to access the marketing system to reallocate those funds to resellers. Intermediaries with pooled funds have the same options to allocate funds or require approvals for individual resellers as the sponsor is afforded. Resellers are notified of the campaign so that they can access the marketing system to make customizations and define the target consumers to which it will be addressed. The resellers customize the marketing content within approved guidelines, elects which social media outlets to post to, set the parameters for online ad placement, and target the email and direct mail elements towards the appropriate targets. The resellers are able to run to both geo-allocated prospects from the centralized sponsor contact database, and to their own target lists. Centralized prospects from the sponsor have locked, time-boxed assignment to individual resellers to avoid channel conflict. The resellers approve and purchases the campaign using a combination of funds made available by the sponsor, by intermediary, and/or its own funds. Pre-approved print and telemarketing vendors are notified of the order, and log in to process the order, rates for which may have already been negotiated ahead of time and are established in the system. The marketing system tracks lead classification and other results to which the sponsor, intermediary and reseller may have appropriate access.

Referring to FIG. 1, there is shown a block diagram of a marketing system 100, according to one embodiment, for facilitating centralized management of a plurality of marketing activities among a plurality of participants 104 of a plurality of marketing networks, the plurality of marketing activities comprising at least a determination of one or more consumers 106 to which marketing content is to be presented and a provision of marketing content thereto. As will be described, the system 100 may implemented by a computer, such as the computer 400 described below with respect to FIG. 4, having a processor 402 and a memory 404 coupled therewith, and coupled with the participants 104 via a network 130, such as Internet or other wired and/or wireless proprietary and/or non-proprietary network 420.

The system 100 includes a registration processor 102, which may be implemented by first logic stored the memory 404 of the computer 400 and executable by the processor 402 or otherwise operative to register, such as via a user interface 118 coupled with the participants 104 via the network 130, each of the plurality of participants 104a-n with the marketing system as being in one of a first participation category or a second participation category, wherein a participant registered in the first participation category comprises an originator of one or more products or services for sale to the one or more consumers and a participant registered in the second participation category comprises a reseller of the one or more products or services to at least a subset of the one or more consumers 106a-n. For example, the first participation category may comprise sponsor participants such as manufacturers, OEM's, or promulgators of a particular brand. The second participation category may comprise reseller participants, i.e. one who purchases for the intent of selling rather than consuming. The one or more products or services sold by the reseller may have been obtained from a registered participant registered in the first participation category. The user interface 118 may be a web based or other type of network accessible interface generated by a web server executed by the processor 402 described below. It will be appreciated that the disclosed marketing system 100 may be accessed by the users thereof, i.e. the participants 104a-n, using any suitable device, mobile or otherwise, having suitable proprietary or non-proprietary software, such as a web browser program, and suitable network connectivity, e.g. a wired or wireless connection to the marketing system 100 via the network 130.

The system 100 also includes a database 108 stored in a memory 110, which may be the same or different from the memory 404, coupled with the registration processor 102 and operative to store a plurality of participant records, each of the plurality of participant records 132 being associated with one of the plurality of registered participants 104a-n and storing participant data characterizing the associated participant 104 as being registered in one of the first or second participation categories, each of the plurality of participant records 132 further storing network data indicative of the associated participant 104 belonging to at least one marketing network of the plurality of marketing networks. Herein, the phrase "coupled with" is defined to mean directly connected to or indirectly connected through one or more intermediate components. Such intermediate components may include both hardware and software based components.

The system 100 further includes a marketing content processor 112, which may be implemented as second logic stored in the memory 404, coupled with the memory 110, and executable by the processor 402 or otherwise operative to receive, such as via the user interface 118/network 130, first marketing content 134 and first content rules 136 associated therewith from a first registered participant 104 registered in the first participation category, store the first marketing content and first content rules in the database 108 and allow access to the stored first marketing content 134 to at least a first subset of other registered participants 104a-n of the plurality of registered participants 104a-n not registered in the first participation category and belonging to a first marketing network of the plurality of marketing networks to which the first registered participant 104 also belongs subject to the first content rules 136. For example, where a channel marketing network is permitted to have more than one participating sponsor, one sponsor may be prevented from accessing the marketing content 134 provided by another sponsor whereas other data, such as messages and other information may be freely shared among sponsors in the same channel marketing network. In an alternative embodiment, inter-sponsor sharing of marketing content 134 may be permitted such as to facilitate a co-sponsored product or joint product marketing, such as for complimentary or symbiotic products. The first content rules 136 may define at least an extent to which the first marketing content 134 may be modified by a registered participant 104 of the first subset of other registered participants 104a-n, a duration for which the first marketing content 134 may be exclusively accessed by a registered participant 104 of the first subset of other registered participants 104a-n, a cost to purchase the first marketing content 134 by a registered participant 104 of the first subset of other registered participants 104a-n, or a combination thereof.

The system 100 further including a funding processor 114, which may be implemented by third logic stored in the memory 404, coupled with the memory 110 and executable by the processor 402 or otherwise operative to receive first funding data 138 and first funding rules 140 associated therewith, such as via the user interface 118/network 130, from the first registered participant 104 and store the first funding data 138 and first funding rules 140 in the database 108, the first funding data 138 specifying first funds available to at least indirectly fund at least a portion of at least one of the plurality of marketing activities by at least one registered participant 104 of the first subset of other registered participants 104a-n with respect to the first marketing content 134 subject to the first funding rules 140. The first funding rules 140 may define at least one condition upon which at least a portion of the first funds may be provided to a registered participant 104 of the first subset of other registered participants 104a-n to fund the at least one of the plurality of marketing activities with respect to the first marketing content 134. For example, the first funding rules 140 may specify that a percentage of the campaign may be paid for using the first funds, the remainder being covered by the registered participant 104.

In one embodiment, the registration processor 102 is further operative to register each of the plurality of participants 104a-n with the marketing system 100 as being in one of the first participation category, the second participation category or a third participation category, wherein a participant 104 registered in the third participation category, e.g. an intermediary participant, comprises a facilitator of the sale of the one or more products or services obtained from a registered participant 104 registered in the first participation category to at least a subset of the one or more consumers by one or more registered participants 104a-n registered in the second participation category. For example, each intermediary participant may be one of a distributor, organization, association, group, or combination thereof. In one embodiment, each of the plurality of marketing networks comprises only one participant registered in the first participation category and at least one participant registered in the second participation category.

The marketing content processor 112 may be further operative to receive second marketing content 134 and second content rules 136 associated therewith from a second registered participant 104 registered in the third participation category, store the second marketing content 134 and second content rules 136 in the database 108 and allow access to the stored second marketing content 134 to at least a second subset of other registered participants 104*a-n* of the plurality of registered participants 104*a-n* belonging to a second marketing network of the plurality of marketing networks to which the second registered participant 104 also belongs subject to the second content rules 136. The first marketing network may be the same as the second marketing network, may overlap with the second marketing network, i.e. have one or more participants in common, or be entirely discrete from the second marketing network.

The funding processor 114 may be further operative to receive second funding data 138 and second funding rules 140 associated therewith from the second registered participant 104 and store the second funding data 138 and second funding rules 140 in the database, the second funding data 138 specifying second funds available to at least indirectly fund at least a portion of at least one of the plurality of marketing activities by at least one registered participant 104 of the second subset of other registered participants 104*a-n* with respect to the second marketing content 134 subject to the second funding rules 140. In one embodiment, the first funding data 138 may further specify third funds available to at least indirectly fund at least a portion of at least one of the plurality of marketing activities by at least one registered participant 104 of the second subset of other registered participants 104*a-n* with respect to the second marketing content 134 subject to the first funding rules 140. The second funds may include at least a portion of the first funds wherein the second registered participant may reallocate the portion first funds to the at least one registered participant 104 of the second subset of other registered participants 104*a-n*, such as subject to the first funding rules 140 provided by the first registered participant 104.

The funding processor 114 may be further operative to receive second funding data 138 and second funding rules 140 associated therewith from the second registered participant 104 and store the second funding data 138 and second funding rules 140 in the database 108, the second funding data 138 specifying second funds available to at least indirectly fund at least a portion of at least one of the plurality of marketing activities by at least one registered participant of the first subset of other registered participants with respect to the first marketing content 134 subject to the first funding rules 140. For example, an intermediary participant may co-fund a marketing campaign of a sponsor participant.

In one embodiment, the system 100 further includes a contact processor 116 coupled with the memory 110 and operative to receive contact data 142 and contact rules 144 associated therewith, such as via the user interface 118/network 130, from a second registered participant 104 registered in the first participation category, store the contact data 142 and contact rules 144 in the database 108 and allow access to the stored contact data 142 to at least the first subset of the other registered participants 104*a-n* subject to the contact rules 144. The contact data 142 may include identification of one or more consumers 106 to which marketing content 134 could be presented, the contact rules 144 defining a first duration for which at least a portion of the contact data 142 identifying a first subset of the one or more consumers 106 may be exclusively accessed by any one registered participant 104 of the first subset of the other registered participants 104*a-n* to present marketing content 134 to the first subset of the one or more consumers 106*a-n*, a second duration for which at least a portion of the contact data 142 identifying a second subset of the one or more consumers 106*a-n* may be exclusively accessed by any one registered participant 104 of the first subset of the other registered participants 104*a-n* subsequent to the presentation of marketing content 134 to the second subset of the one or more consumers 106*a-n*, a third duration for which at least a portion of the contact data 142 identifying a third subset of the one or more consumers 106*a-n* may be exclusively accessed by any one registered participant 104 of the first subset of the other registered participants 104*a-n* to the presentation of marketing content 134 to the third subset of the one or more consumers 106*a-n* having demonstrated an interest in the presented marketing content 134, or a combination thereof.

Alternatively, or in addition thereto, the contact processor 116 may be coupled with the memory 110 and operative to receive contact data 142 and contact rules 144 associated therewith from a second participant 104 registered in the second participation category, store the contact data 142 and contact rules 144 in the database 108 and prevent access to the stored contact data 144 by other registered participants 104*a-n* of the plurality of registered participants 104*a-n*.

In one embodiment, the registration processor 102 is further operative to receive an indication, such as via the user interface 118/network 130, from one registered participant 104 to join at least one marketing network of the plurality of marketing networks and update the respective participant record 132 in accordance therewith. The at least one marketing network may include at least one registered participant 104 registered in the first participation category belonging thereto, wherein the registration processor 102 is further operative to transmit a request to allow the one registered participant 104 to join the at least one marketing network, the update being further contingent upon receipt of an affirmative response, e.g., a sponsor participant may be required to approve the addition of a reseller or intermediary participant to its channel marketing network. Alternatively, or in addition thereto, participating sponsors, intermediaries and/or resellers 104*a-n* may be permitted to invite other participants 104*a-n* to join their respective channel marketing network(s) wherein the indication is received responsive to the invitation to join the at least one marketing network transmitted to the one registered participant 104, via the user interface 118 and/or network 130, by another registered participant 104 belonging to the at least one marketing network. In one embodiment, non-registered participants may be invited to join, e.g. the one registered participant 104 may have received the invitation prior to registration with the marketing system 100.

In one embodiment, the registration processor 102 is further operative to present, such as via the user interface 118/network 130, prior to the receipt of the indication, to the one registered participant 104 a list of available marketing networks of the plurality of marketing networks and receive a selection from the one registered participant 104 to join at least one of the available marketing networks. The registration processor 102 may be further operative to receive, prior to the presentation of the list, from another registered participant 104 belonging to the at least one marketing network, a specification of a subset of other registered participants 104a-n allowed to join the at least one marketing network, the list of available marketing networks being constrained thereby.

In one embodiment, the marketing content processor 112 is further operative to receive second marketing content 134 and second content rules 136 associated therewith from a second registered participant 104 registered in the first participation category, e.g. another sponsor participant, store the second marketing content 134 and second content rules 136 in the database 108 and allow access to the stored second marketing content 134 to at least a second subset of other registered participants 104a-n of the plurality of registered participants 104a-n not registered in the first participation category, e.g. another channel marketing network, and belonging to a second marketing network of the plurality of marketing networks to which the second registered participant 104 also belongs subject to the second content rules 136. In addition, the funding processor 114 may further operative to receive second funding data 138 and second funding rules 140 associated therewith from the second registered participant 104 and store the second funding data 138 and second funding rules 140 in the database 108, the second funding data 138 specifying second funds available to at least indirectly fund at least a portion of at least one of the plurality of marketing activities by at least one registered participant 104 of the second subset of other registered participants 104a-n with respect to the second marketing content 134 subject to the second funding rules. It will be appreciated that the first and second registered participants 104 may be the same or different and further that he first subset of other registered participants 104a-n may be the same as, may overlap with or may be different from, the second subset of other registered participants 104a-n. In this way, sponsors may have multiple channel marketing networks and/or distribute different marketing content 134 subject to content specific rules 136.

In one embodiment, the system 100 may further include a campaign processor 120 operative to conduct at least one advertising campaign, and wherein the first marketing content 134 comprises marketing collateral for an advertising campaign to present the first marketing content 134 to one or more consumers 106a-n, the campaign to be conducted by the campaign processor 120 via one or more communications media 146, such as via electronic mail, postal mail, by mobile or wired telephone, via a web page, via Short Messaging Service (SMS) or Multimedia Messaging Service (MMS), Instant Messaging, or other electronic or other medium, for the conveyance of marketing information or otherwise, or a combination thereof, which may be provided and/or operated by a third party service provider. It will be appreciated that, for the purposes of conducting advertising campaigns, the campaign processor 120 may interface or otherwise integrate with one or more third party service providers (not shown) which implement the specific campaigns over specific media. For example, the campaign processor 120 may interface with a television studio for the purpose of producing a television advertisement, a social media web site, e.g. Facebook™, for the purpose of advertising on that web site, or an internet based advertising service or ad network, e.g. DoubleClick™ or Google™, for the purpose of advertising on the world wide web. In this way, the marketing system acts as an aggregator and centralized provider of third party marketing services. Each of the one or more consumers 106a-n may include a target consumer 106 selected from contact data 142 provided by a registered participant 104 belonging to the first marketing network, the campaign processor 120 being further operative to determine, subsequent to the campaign, at least one lead comprising a one of the one or more selected target consumers 106a-n who demonstrate an interest in the first marketing content 134. The campaign processor 120 may be further operative to execute the advertising campaign to present the first marketing content 134 to the one or more consumers 106a-n on behalf of at least one of the registered participants 104a-n belonging to the first marketing network. Further, the first content rules 136 may specify an extent to which the at least one registered participant 104 is allowed to modify the first marketing content 134 prior to the execution, and wherein the campaign processor 120 is further operative to mediate modification of the first marketing content 134 in accordance with the first content rules 136 to allow, moderate or prevent modification thereof prior to the execution of the campaign. In one embodiment, the campaign processor 120 is further operative to evaluate, subsequent to the execution, results of the advertising campaign and allow access to the evaluation to the first registered participant 104. In addition, the campaign processor 120 may be further operative to prevent the first registered participant from accessing an identity of the one or more consumer 106a-n having demonstrated interest in the advertising campaign. Further, the execution of the advertising campaign may be characterized by a cost, such as a cost charged by the system 100 for conducting the campaign, and further wherein the first funding data 138 comprises a first allocation of the first funds to an account associated with the third participant 104, the first funding rules 140 associated therewith specifying an extent to which the at least one of the associated first subset of the plurality of participants 104a-n may be entitled to at least a portion of the first allocation of funds to cover at least a portion of the cost of the execution of the advertising campaign.

Figure 2:
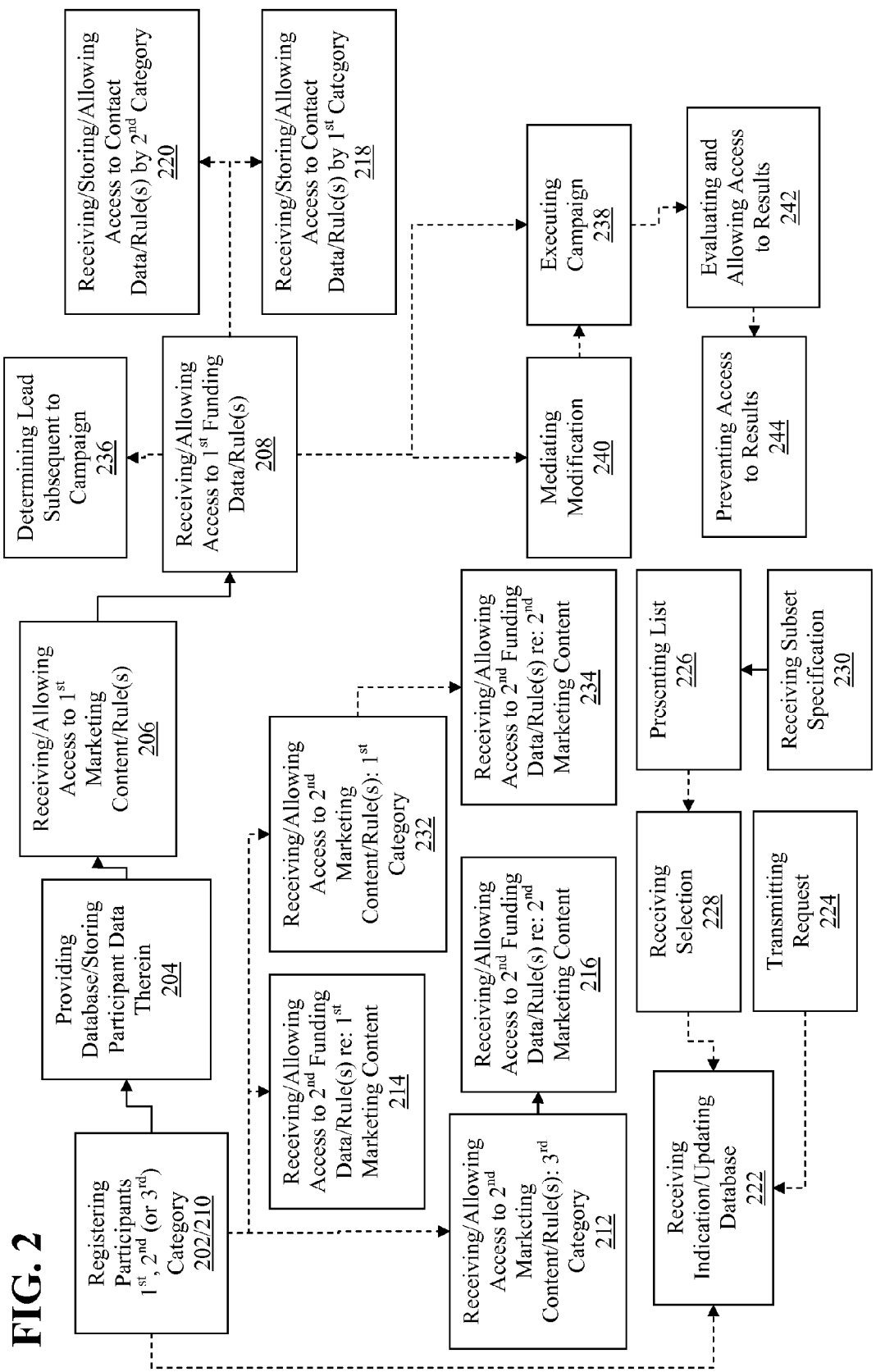
FIG. 2 shows a flow chart depicting operation of the system of FIG. 1 according to one embodiment.

Referring to FIG. 2, there is shown a flow chart depicting operation of the system of FIG. 1 according to one embodiment. In particular, a computer implemented method is depicted for facilitating centralized management, by a marketing system 100, of a plurality of marketing activities among a plurality of participants 104a-n of a plurality of marketing networks, the plurality of marketing activities comprising at least a determination of one or more consumers 106a-n to which marketing content is to be presented and a provision of marketing content thereto, the computer comprising a processor 402 and a memory 110/404 coupled therewith and storing suitable program code executable by the processor 402.

The operation includes: registering, by the processor 402, each of the plurality of participants 104a-n with the marketing system 100 as being in one of a first participation category or a second participation category, wherein a participant 104 registered in the first participation category comprises an originator of one or more products or services for sale to the one or more consumers 106a-n, such a sponsor, e.g. a manufacturer, OEM or other brand promulgator, and a participant 104 registered in the second participation category comprises a reseller of the one or more products to at least a subset of the one or more consumers 106a-n, e.g. one who purchases with the intent of selling rather than consuming (block 202); providing a database 108 stored in the memory 110/404 and operative to store a plurality of participant records 132, each of the plurality of participant records 132 being associated with one of the plurality of registered participants 104a-n and storing participant data characterizing the associated participant 104 as being registered in one of the first or second participation categories, each of the plurality of participant records 132 further storing network data indicative of the associated participant 104 belonging to at least one marketing network of the plurality of marketing networks (block 204); receiving first marketing content 134 and first content rules 136 associated therewith from a first registered participant 104 registered in the first participation category, storing the first marketing content 134 and first content rules 136 in the database 108 and allowing access to the stored first marketing content 134 to at least a first subset of other registered participants 104a-n of the plurality of registered participants 104a-n not registered in the first participation category and belonging to a first marketing network of the plurality of marketing networks to which the first registered participant 104 also belongs subject to the first content rules 136 (block 206); and receiving first funding data 138 and first funding rules 140 associated therewith from the first registered participant 104 and storing the first funding data 138 and first funding rules 140 in the database 108, the first funding data 138 specifying first funds available to at least indirectly fund at least a portion of at least one of the plurality of marketing activities by at least one registered participant 104 of the first subset of other registered participants 104a-n with respect to the first marketing content 134 subject to the first funding rules 140 (block 208).

The first content rules 136 may define at least an extent to which the first marketing content 134 may be modified by a registered participant 104 of the first subset of other registered participants 104a-n, a duration for which the first marketing content 134 may be exclusively accessed by a registered participant 104 of the first subset of other registered participants 104a-n, a cost to purchase the first marketing content 134 by a registered participant 104 of the first subset of other registered participants 104a-n, or a combination thereof. The first funding rules 140 may define at least one condition upon which at least a portion of the first funds may be provided to a registered participant 104 of the first subset of other registered participants 104a-n to fund the at least one of the plurality of marketing activities with respect to the first marketing content 134.

In one embodiment, a registered participant 104 registered in the second participation category may include a reseller of the one or more products obtained from a registered participant 104 registered in the first category.

In one embodiment, the registering may further include registering each of the plurality of participants 104a-n with the marketing system 100 as being in one of the first participation category, the second participation category or a third participation category, wherein a participant 104 registered in the third participation category comprises a facilitator of the sale of the one or more products or services obtained from a registered participant 104 registered in the first participation category to at least a subset of the one or more consumers 106a-n by one or more registered participants 104a-n registered in the second participation category, e.g. an intermediary, such as a distributor, organization, association, group, or combination thereof (block 210).

In one exemplary embodiment, each of the plurality of marketing networks may include only one participant 104 registered in the first participation category and at least one participant 104 registered in the second participation category.

In one embodiment, the operation of the disclosed system 100 may further include receiving second marketing content 134 and second content rules 136 associated therewith from a second registered participant 104 registered in the third participation category, storing the second marketing content 134 and second content rules 136 in the database 108 and allowing access to the stored second marketing content 134 to at least a second subset of other registered participants 104a-n of the plurality of registered participants 104a-n belonging to a second marketing network of the plurality of marketing networks to which the second registered participant 104 also belongs subject to the second content rules 136 (block 212). The first marketing network may the same as, overlap with or be different from the second marketing network.

In one embodiment, operation of the disclosed system 100 may further include receiving second funding data 138 and second funding rules 140 associated therewith from the second registered participant 104 and storing the second funding data 138 and second funding rules 140 in the database 108, the second funding data 138 specifying second funds, which may comprise at least a portion of the first funds, available to at least indirectly fund at least a portion of at least one of the plurality of marketing activities by at least one registered participant 104 of the second subset of other registered participants 104a-n with respect to the second marketing content 138 subject to the second funding rules 140 (block 214). In one embodiment, the first funding data 138 may further specify third funds available to at least indirectly fund at least a portion of at least one of the plurality of marketing activities by at least one registered participant 104 of the second subset of other registered participants 104a-n with respect to the second marketing content 134 subject to the first funding rules 140.

Alternatively, or in addition thereto, operation of the disclosed system 100 may include receiving second funding data 138 and second funding rules 140 associated therewith from the second registered participant 104 and storing the second funding data 138 and second funding rules 140 in the database 108, the second funding data 138 specifying second funds available to at least indirectly fund at least a portion of at least one of the plurality of marketing activities by at least one registered participant 104 of the first subset of other registered participants 104a-n with respect to the first marketing content 134 subject to the first funding rules 140 (block 216).

In one embodiment, operation of the disclosed system may include receiving contact data 142 and contact rules 144 associated therewith from a second registered participant 104 registered in the first participation category, storing the contact data 142 and contact rules 144 in the database 108 and allowing access to the stored contact data 142 to at least the first subset of the other registered participants 104a-n subject to the contact rules 144 (block 218). The contact data 142 may include identification of one or more consumers 106a-n to which marketing content 134 could be presented, the contact rules 144 defining a first duration for which at least a portion of the contact data 142 identifying a first subset of the one or more consumers 106a-n may be exclusively accessed by any one registered participant 104 of the first subset of the other registered participants 104a-n to present marketing content 134 to the first subset of the one or more consumers 106a-n, a second duration for which at least a portion of the contact data 142 identifying a second subset of the one or more consumers 106a-n may be exclusively accessed by any one registered participant 104 of the first subset of the other registered participants 104a-n subsequent to the presentation of marketing content 134 to the second subset of the one or more consumers 106a-n, a third duration for which at least a portion of the contact data 142 identifying a third subset of the one or more consumers 106a-n may be exclusively accessed by any one registered participant 104 of the first subset of the other registered participants 104a-n subsequent to the presentation of marketing content 134 to the third subset of the one or more consumers 106a-n having demonstrated an interest in the presented marketing content 134, or a combination thereof.

Alternatively, or in addition thereto, operation of the disclosed system may include receiving contact data 142 and contact rules 144 associated therewith from a second participant 104 registered in the second participation category, storing the contact data 142 and contact rules 144 in the database 108 and preventing access to the stored contact data by other registered participants of the plurality of registered participants (block 220).

In one embodiment, operation of the disclosed system 100 may include receiving an indication from one registered participant 104 to join at least one marketing network of the plurality of marketing networks and updating the respective participant record 132 in accordance therewith (block 222). The at least one marketing network may include at least one registered participant 104 registered in the first participation category belonging thereto, the method further comprising transmitting a request to allow the one registered participant 104 to join the at least one marketing network, the updating be further contingent upon receipt of an affirmative response (block 224). Further, the indication may be received responsive to an invitation to join the at least one marketing network, which may have been received prior one registered participant 104 registering with the marketing system 100, transmitted to the one registered participant 104 by another registered participant 104 belonging to the at least one marketing network. In one embodiment, the operation of the disclosed system 100 may further include presenting, prior to the receiving, to the one registered participant 104 a list of available marketing networks of the plurality of marketing networks (block 226) and receiving a selection from the one registered participant 104 to join at least one of the available marketing networks (block 228). Alternatively, or in addition thereto, the operation of the disclosed marketing system may include receiving, prior to the presenting, from another registered participant 104 belonging to the at least one marketing network, a specification of a subset of other registered participants 104a-n allowed to join the at least one marketing network, the list of available marketing networks being constrained thereby (block 230).

In one embodiment, the operation of the disclosed system 100 further includes: receiving second marketing content 134 and second content rules 136 associated therewith from a second registered participant 104, which may be different from the first participant 104, registered in the first participation category, storing the second marketing content 134 and second content rules 136 in the database 108 and allowing access to the stored second marketing content 134 to at least a second subset of other registered participants 104a-n of the plurality of registered participants 104a-n not registered in the first participation category, which may be different from the first subset, and belonging to a second marketing network of the plurality of marketing networks to which the second registered participant 104 also belongs subject to the second content rules 136 (block 232); and receiving second funding data 138 and second funding rules 140 associated therewith from the second registered participant 104 and storing the second funding data 138 and second funding rules 140 in the database 108, the second funding data 138 specifying second funds available to at least indirectly fund at least a portion of at least one of the plurality of marketing activities by at least one registered participant 104 of the second subset of other registered participants 104a-n with respect to the second marketing content 134 subject to the second funding rules (block 234).

In one embodiment, the first marketing content 134 may include marketing collateral for an advertising campaign to present the first marketing content 134 to one or more consumers 106a-n, the campaign to be conducted by the marketing system 100 via electronic mail, postal mail, by telephone, via a web page, or other electronic or non-electronic medium, or a combination thereof. Further, each of the one or more consumers 106a-n may include a target consumer 106 selected from contact data 142 provided by a registered participant 104 belonging to the first marketing network, the operation of the disclosed system 100 may further include determining, subsequent to the conducting of the campaign, at least one lead comprising a one of the one or more selected target consumers 106a-n who demonstrate an interest in the marketing content (block 236).

The operation of the disclosed system 100 may further include executing the advertising campaign to present the first marketing content 134 to the one or more consumers 106a-n on behalf of at least one of the registered participants 104a-n belonging to the first marketing network (block 238). The first content rules 136 may specify an extent to which the at least one registered participant 104 is allowed to modify the first marketing content 134 prior to the executing, and wherein the operation of the disclosed marketing system 100 includes mediating modification of the first marketing content 134 in accordance with the first content rules 136 to allow or prevent modification thereof prior to the executing (block 240).

The operation of the disclosed embodiments may also include evaluating, subsequent to the executing, results of the advertising campaign and allowing access to the evaluation to the first registered participant 104 (block 242). In one exemplary embodiment, the operation may further include preventing the first registered participant 104 from accessing an identity of the one or more consumers 106a-n having demonstrated interest in the advertising campaign (block 244).

The execution of the advertising campaign is characterized by a cost and further wherein the first funding data 138 comprises a first allocation of the first funds to an account associated with the third participant 104, the first funding rules associated therewith specifying an extent to which the at least one of the associated first subset of the plurality of participants 104a-n may be entitled to at least a portion of the first allocation of funds to cover at least a portion of the cost of the execution of the advertising campaign.

Figure 3:
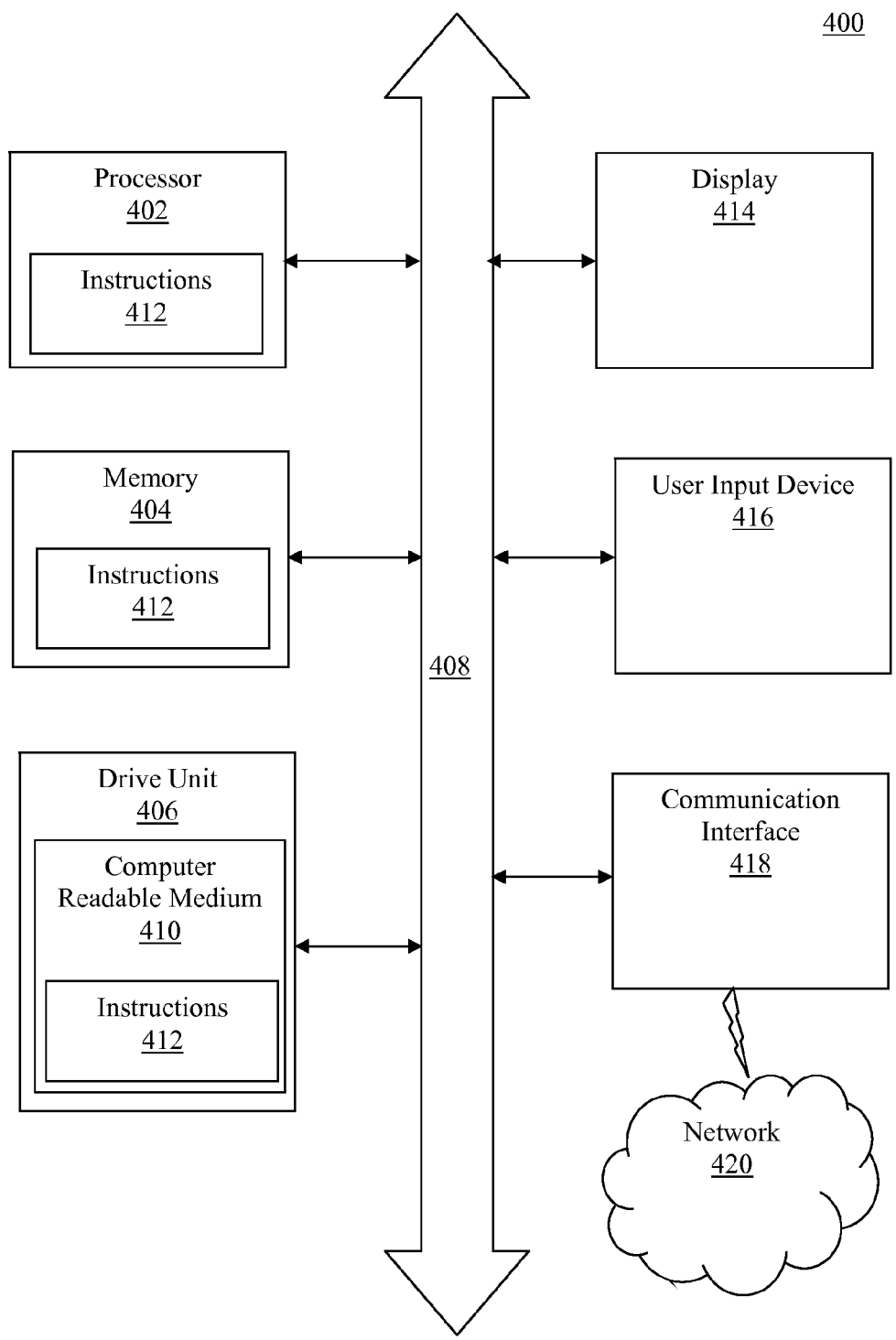
FIG. 3 shows an illustrative embodiment of a general computer system for use with the system of FIG. 1.

Referring to FIG. 3, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above may be a computer system 400 or a component in the computer system 400. The computer system 400 may implement the marketing system 100, or any or all of the registration processor 102, marketing content processor 112, funding processor 114, contact processor 116, user interface 118, campaign processor 120, of which the disclosed embodiments are a component thereof.

In one embodiment, the disclosed system is implemented in the C# programming language using the Microsoft .NET Framework 4.0 and Microsoft IIS 7 Web Services within the Windows Azure Platform which is a Microsoft cloud platform used to build, host and scale web applications through Microsoft datacenters. The Windows Azure Platform is thus classified as platform as a service and forms part of Microsoft's cloud computing strategy, along with their software as a service offering, Microsoft Online Services. The platform consists of various on-demand services hosted in Microsoft data centers and commoditized through three product brands. These are Windows Azure (an operating system providing scalable compute and storage facilities), SQL Azure (a cloud-based, scale-out version of SQL Server) and Windows Azure AppFabric (a collection of services supporting applications both in the cloud and on premise). The Windows Azure Platform provides an API built on REST, HTTP and XML that allows a developer to interact with the services provided by Windows Azure.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

In an alternative embodiment, an alternative system 100 may be implemented for facilitating centralized management, by a marketing system, of a plurality of marketing activities among a plurality of participants 104*a-n* of a plurality of marketing networks, the plurality of marketing activities comprising at least a determination of one or more consumers 106*a-n* to which marketing content is to be presented and a provision of marketing content thereto. The system 100 includes a registration processor 102 operative to register each of the plurality of participants 104*a-n* with the marketing system as being in one of a first participation category or a second participation category, wherein a participant 104 registered in the first participation category comprises an originator of one or more products or services for sale to the one or more consumers 106*a-n* and a participant 104 registered in the second participation category comprises a reseller of the one or more products or services to at least a subset of the one or more consumers. The system also includes a database 108 stored in a memory 110 coupled with the registration processor 102 and operative to store a plurality of participant records 132, each of the plurality of participant records 132 being associated with one of the plurality of registered participants 104*a-n* and storing participant data characterizing the associated participant 104 as being registered in one of the first or second participation categories, each of the plurality of participant records 132 further storing network data indicative of the associated participant belonging to at least one marketing network of the plurality of marketing networks. The system also includes a contact processor 116 coupled with the memory 119 and operative to receive contact data 142 and contact rules 144 associated therewith from a registered participant 104 registered in the first participation category, store the contact data 142 and contact rules 144 in the database 108 and allow access to the stored contact data to at least the first subset of the other registered participants subject to the contact rules. In this way, the system 100 may facilitate a sponsor, for example, which provides contact information to their marketing network(s) but may not provide marketing content or funding as described above. In this implementation, the system 100 may facilitate only the exchange of content data 142 among the marketing network participant 104*a-n* and may or may not require the implementation of functionality to handle marketing content or funding. In one embodiment, the contact data 142 may include identification of one or more consumers 106*a-n* to which marketing content could be presented, the contact rules 144 defining a first duration for which at least a portion of the contact data identifying a first subset of the one or more consumers 106*a-n* may be exclusively accessed by any one registered participant 104 of the first subset of the other registered participants 104*a-n* to present marketing content to the first subset of the one or more consumers 106*a-n*, a second duration for which at least a portion of the contact data 142 identifying a second subset of the one or more consumers 106*a-n* may be exclusively accessed by any one registered participant 104 of the first subset of the other registered participants 104*a-n* subsequent to the presentation of marketing content to the second subset of the one or more consumers, a third duration for which at least a portion of the contact data 142 identifying a third subset of the one or more consumers may be exclusively accessed by any one registered participant 104 of the first subset of the other registered participants 104*a-n* subsequent to the presentation of marketing content to the third subset of the one or more consumers 106*a-n* having demonstrated an interest in the presented marketing content, or a combination thereof. This allows, for example, a sponsor to manage channel conflict as it relates to their marketing program(s), i.e. avoid duplicate efforts by resellers by segregating potential customers among the resellers while continuing to maintain control and ensure that the resellers actively engage in the desired marketing activities.

The disclosed alternative embodiment may further include a computer implemented method for facilitating centralized management, by a marketing system 100, of a plurality of marketing activities among a plurality of participants 104*a-n* of a plurality of marketing networks, the plurality of marketing activities comprising at least a determination of one or more consumers 106*a-n* to which marketing content is to be presented and a provision of marketing content thereto. The operation may include: registering, by a processor, each of the plurality of participants 104*a-n* with the marketing system 100 as being in one of a first participation category or a second participation category, wherein a participant 104 registered in the first participation category comprises an originator of one or more products or services for sale to the one or more consumers 106*a-n* and a participant 104 registered in the second participation category comprises a reseller of the one or more products or services to at least a subset of the one or more consumers 106*a-n*; providing a database 108 stored in the memory 110 and operative to store a plurality of participant records, each of the plurality of participant records being associated with one of the plurality of registered participants 104*a-n* and storing participant data characterizing the associated participant 104 as being registered in one of the first or second participation categories, each of the plurality of participant records further storing network data indicative of the associated participant 104 belonging to at least one marketing network of the plurality of marketing networks; and receiving contact data 142 and contact rules 144 associated therewith from a registered participant 104 registered in the first participation category, storing the contact data 142 and contact rules 144 in the database 108 and allowing access to the stored contact data to at least the first subset of the other registered participants 104*a-n* subject to the contact rules. As described above, the contact data 142 may include identification of one or more consumers 106*a-n* to which marketing content could be presented, the contact rules 144 defining a first duration for which at least a portion of the contact data 142 identifying a first subset of the one or more consumers 106*a-n* may be exclusively accessed by any one registered participant 104 of the first subset of the other registered participants 104*a-n* to present marketing content to the first subset of the one or more consumers 106*a-n*, a second duration for which at least a portion of the contact data 142 identifying a second subset of the one or more consumers 106*a-n* may be exclusively accessed by any one registered participant 104 of the first subset of the other registered participants 104*a-n* subsequent to the presentation of marketing content to the second subset of the one or more consumers 106*a-n*, a third duration for which at least a portion of the contact data 142 identifying a third subset of the one or more consumers 106*a-n* may be exclusively accessed by any one registered participant 104 of the first subset of the other registered participants 104*a-n* subsequent to the presentation of marketing content to the third subset of the one or more consumers 106*a-n* having demonstrated an interest in the presented marketing content, or a combination thereof.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

We claim:

1. A computer implemented method for facilitating centralized management, by a marketing system, of a plurality of marketing activities among a plurality of participants of a plurality of marketing networks, the plurality of marketing activities comprising at least a determination of one or more consumers to which marketing content is to be presented and a provision of marketing content thereto, the computer comprising a processor and a memory coupled therewith, the method comprising:

registering, by the processor, each of the plurality of participants with the marketing system as being in one of a first participation category or a second participation category, wherein a participant registered in the first participation category comprises an originator of one or more products or services for sale to the one or more consumers and a participant registered in the second participation category comprises a reseller of the one or more products or services to at least a subset of the one or more consumers;

providing a database stored in the memory and operative to store a plurality of participant records, each of the plurality of participant records being associated with one of the plurality of registered participants and storing participant data characterizing the associated participant as being registered in one of the first or second participation categories, each of the plurality of participant records further storing network data indicative of the associated participant belonging to at least one marketing network of the plurality of marketing networks;

receiving first marketing content and first content rules associated therewith from a first registered participant registered in the first participation category, storing the first marketing content and first content rules in the database and allowing access to the stored first marketing content to at least a first subset of other registered participants of the plurality of registered participants not registered in the first participation category and belonging to a first marketing network of the plurality of marketing networks to which the first registered participant also belongs subject to the first content rules; and receiving first funding data and first funding rules associated therewith from the first registered participant and storing the first funding data and first funding rules in the database, the first funding data specifying first funds available to at least indirectly fund at least a portion of at least one of the plurality of marketing activities by at least one registered participant of the first subset of other registered participants with respect to the first marketing content subject to the first funding rules.

2. The computer implemented method of claim 1 wherein the registering further comprises registering each of the plurality of participants with the marketing system as being in one of the first participation category, the second participation category or a third participation category, wherein a participant registered in the third participation category comprises a facilitator of the sale of the one or more products or services obtained from a registered participant registered in the first participation category to at least a subset of the one or more consumers by one or more registered participants registered in the second participation category.

3. The computer implemented method of claim 2 wherein each of the plurality of marketing networks comprises only one participant registered in the first participation category and at least one participant registered in the second participation category.

4. The computer implemented method of claim 2 further comprising receiving second marketing content and second content rules associated therewith from a second registered participant registered in the third participation category, storing the second marketing content and second content rules in the database and allowing access to the stored second marketing content to at least a second subset of other registered participants of the plurality of registered participants belonging to a second marketing network of the plurality of marketing networks to which the second registered participant also belongs subject to the second content rules.

5. The computer implemented method of claim 4 further comprising receiving second funding data and second funding rules associated therewith from the second registered participant and storing the second funding data and second funding rules in the database, the second funding data specifying second funds available to at least indirectly fund at least a portion of at least one of the plurality of marketing activities by at least one registered participant of the second subset of other registered participants with respect to the second marketing content subject to the second funding rules.

6. The computer implemented method of claim 5 wherein the first funding data further specifies third funds available to at least indirectly fund at least a portion of at least one of the plurality of marketing activities by at least one registered participant of the second subset of other registered participants with respect to the second marketing content subject to the first funding rules.

7. The computer implemented method of claim 2 further comprising receiving second funding data and second funding rules associated therewith from the second registered participant and storing the second funding data and second funding rules in the database, the second funding data specifying second funds available to at least indirectly fund at least a portion of at least one of the plurality of marketing activities by at least one registered participant of the first subset of other registered participants with respect to the first marketing content subject to the first funding rules.

8. The computer implemented method of claim 1 further comprising receiving contact data and contact rules associated therewith from a second registered participant registered in the first participation category, storing the contact data and contact rules in the database and allowing access to the stored contact data to at least the first subset of the other registered participants subject to the contact rules.

9. The computer implemented method of claim 8 wherein the contact data comprise identification of one or more consumers to which marketing content could be presented, the contact rules defining a first duration for which at least a portion of the contact data identifying a first subset of the one or more consumers may be exclusively accessed by any one registered participant of the first subset of the other registered participants to present marketing content to the first subset of the one or more consumers, a second duration for which at least a portion of the contact data identifying a second subset of the one or more consumers may be exclusively accessed by any one registered participant of the first subset of the other registered participants subsequent to the presentation of marketing content to the second subset of the one or more consumers, a third duration for which at least a portion of the contact data identifying a third subset of the one or more consumers may be exclusively accessed by any one registered participant of the first subset of the other registered participants subsequent to the presentation of marketing content to the third subset of the one or more consumers having demonstrated an interest in the presented marketing content, or a combination thereof.

10. The computer implemented method of claim 1 further comprising receiving contact data and contact rules associated therewith from a second participant registered in the second participation category, storing the contact data and contact rules in the database and preventing access to the stored contact data by other registered participants of the plurality of registered participants.

11. The computer implemented method of claim 1 further comprising:
receiving an indication from one registered participant to join at least one marketing network of the plurality of marketing networks and updating the respective participant record in accordance therewith.

12. The computer implemented method of claim 11 wherein the indication is received responsive to an invitation to join the at least one marketing network transmitted to the one registered participant by another registered participant belonging to the at least one marketing network.

13. The computer implemented method of claim 11 further comprising:
presenting, prior to the receiving, to the one registered participant a list of available marketing networks of the plurality of marketing networks; and
receiving a selection from the one registered participant to join at least one of the available marketing networks.

14. The computer implemented method of claim 13 further comprising:
receiving, prior to the presenting, from another registered participant belonging to the at least one marketing network, a specification of a subset of other registered participants allowed to join the at least one marketing network, the list of available marketing networks being constrained thereby.

15. The computer implemented method of claim 1 further comprising:
receiving second marketing content and second content rules associated therewith from a second registered participant registered in the first participation category, storing the second marketing content and second content rules in the database and allowing access to the stored second marketing content to at least a second subset of other registered participants of the plurality of registered participants not registered in the first participation category and belonging to a second marketing network of the plurality of marketing networks to which the second registered participant also belongs subject to the second content rules; and receiving second funding data and second funding rules associated therewith from the second registered participant and storing the second funding data and second funding rules in the database, the second funding data specifying second funds available to at least indirectly fund at least a portion of at least one of the plurality of marketing activities by at least one registered participant of the second subset of other registered participants with respect to the second marketing content subject to the second funding rules.

16. The computer implemented method of claim 15 wherein the first subset of other registered participants is different from the second subset of other registered participants.

17. The computer implemented method of claim 1 wherein the first marketing content comprises marketing collateral for an advertising campaign to present the first marketing content to one or more consumers, the campaign to be conducted by the marketing system via electronic mail, postal mail, by telephone, via a web page, or a combination thereof.

18. The computer implemented method of claim 17 further comprising:

executing the advertising campaign to present the first marketing content to the one or more consumers on behalf of at least one of the registered participants belonging to the first marketing network.

19. The computer implemented method of claim 18 wherein the first content rules specify an extent to which the at least one registered participant is allowed to modify the first marketing content prior to the executing, and wherein the method further comprises mediating modification of the first marketing content in accordance with the first content rules to allow or prevent modification thereof prior to the executing.

20. The computer implemented method of claim 18 further comprising evaluating, subsequent to the executing, results of the advertising campaign and allowing access to the evaluation to the first registered participant.

21. The computer implemented method of claim 18 wherein the execution of the advertising campaign is characterized by a cost and further wherein the first funding data comprises a first allocation of the first funds to an account associated with the third participant, the first funding rules associated therewith specifying an extent to which the at least one of the associated first subset of the plurality of participants may be entitled to at least a portion of the first allocation of funds to cover at least a portion of the cost of the execution of the advertising campaign.

22. The computer implemented method of claim 1 wherein the first content rules define at least an extent to which the first marketing content may be modified by a registered participant of the first subset of other registered participants, a duration for which the first marketing content may be exclusively accessed by a registered participant of the first subset of other registered participants, a cost to purchase the first marketing content by a registered participant of the first subset of other registered participants, or a combination thereof.

23. The computer implemented method of claim 1 wherein the first funding rules define at least one condition upon which at least a portion of the first funds may be provided to a registered participant of the first subset of other registered participants to fund the at least one of the plurality of marketing activities with respect to the first marketing content.

24. A system for facilitating centralized management, by a marketing system, of a plurality of marketing activities among a plurality of participants of a plurality of marketing networks, the plurality of marketing activities comprising at least a determination of one or more consumers to which marketing content is to be presented and a provision of marketing content thereto, the system comprising:

a registration processor operative to register each of the plurality of participants with the marketing system as being in one of a first participation category or a second participation category, wherein a participant registered in the first participation category comprises an originator of one or more products or services for sale to the one or more consumers and a participant registered in the second participation category comprises a reseller of the one or more products or services to at least a subset of the one or more consumers;

a database stored in a memory coupled with the registration processor and operative to store a plurality of participant records, each of the plurality of participant records being associated with one of the plurality of registered participants and storing participant data characterizing the associated participant as being registered in one of the first or second participation categories, each of the plurality of participant records further storing network data indicative of the associated participant belonging to at least one marketing network of the plurality of marketing networks;

a marketing content processor coupled with the memory and operative to receive first marketing content and first content rules associated therewith from a first registered participant registered in the first participation category, store the first marketing content and first content rules in the database and allow access to the stored first marketing content to at least a first subset of other registered participants of the plurality of registered participants not registered in the first participation category and belonging to a first marketing network of the plurality of marketing networks to which the first registered participant also belongs subject to the first content rules; and a funding processor coupled with the memory and operative to receive first funding data and first funding rules associated therewith from the first registered participant and store the first funding data and first funding rules in the database, the first funding data specifying first funds available to at least indirectly fund at least a portion of at least one of the plurality of marketing activities by at least one registered participant of the first subset of other registered participants with respect to the first marketing content subject to the first funding rules.

25. The system of claim 24 wherein the registration processor is further operative to register each of the plurality of participants with the marketing system as being in one of the first participation category, the second participation category or a third participation category, wherein a participant registered in the third participation category comprises a facilitator of the sale of the one or more products or services obtained from a registered participant registered in the first participation category to at least a subset of the one or more consumers by one or more registered participants registered in the second participation category.

26. The system of claim 25 wherein each of the plurality of marketing networks comprises only one participant registered in the first participation category and at least one participant registered in the second participation category.

27. The system of claim 25 wherein the marketing content processor is further operative to receive second marketing content and second content rules associated therewith from a second registered participant registered in the third participation category, store the second marketing content and second content rules in the database and allow access to the stored second marketing content to at least a second subset of other registered participants of the plurality of registered participants belonging to a second marketing network of the plurality of marketing networks to which the second registered participant also belongs subject to the second content rules.

28. The system of claim 27 wherein the funding processor is further operative to receive second funding data and second funding rules associated therewith from the second registered participant and store the second funding data and second funding rules in the database, the second funding data specifying second funds available to at least indirectly fund at least a portion of at least one of the plurality of marketing activities by at least one registered participant of the second subset of other registered participants with respect to the second marketing content subject to the second funding rules.

29. The system of claim 28 wherein the first funding data further specifies third funds available to at least indirectly fund at least a portion of at least one of the plurality of marketing activities by at least one registered participant of the second subset of other registered participants with respect to the second marketing content subject to the first funding rules.

30. The system of claim 25 wherein the funding processor is further operative to receive second funding data and second funding rules associated therewith from the second registered participant and store the second funding data and second funding rules in the database, the second funding data specifying second funds available to at least indirectly fund at least a portion of at least one of the plurality of marketing activities by at least one registered participant of the first subset of other registered participants with respect to the first marketing content subject to the first funding rules.

31. The system of claim 24 further comprising a contact processor coupled with the memory and operative to receive contact data and contact rules associated therewith from a second registered participant registered in the first participation category, store the contact data and contact rules in the database and allow access to the stored contact data to at least the first subset of the other registered participants subject to the contact rules.

32. The system of claim 31 wherein the contact data comprise identification of one or more consumers to which marketing content could be presented, the contact rules defining a first duration for which at least a portion of the contact data identifying a first subset of the one or more consumers may be exclusively accessed by any one registered participant of the first subset of the other registered participants to present marketing content to the first subset of the one or more consumers, a second duration for which at least a portion of the contact data identifying a second subset of the one or more consumers may be exclusively accessed by any one registered participant of the first subset of the other registered participants subsequent to the presentation of marketing content to the second subset of the one or more consumers, a third duration for which at least a portion of the contact data identifying a third subset of the one or more consumers may be exclusively accessed by any one registered participant of the first subset of the other registered participants subsequent to the presentation of marketing content to the third subset of the one or more consumers having demonstrated an interest in the presented marketing content, or a combination thereof.

33. The system of claim 24 further comprising a contact processor coupled with the memory and operative to receive contact data and contact rules associated therewith from a second participant registered in the second participation category, store the contact data and contact rules in the database and prevent access to the stored contact data by other registered participants of the plurality of registered participants.

34. The system of claim 24 wherein the registration processor is further operative to receive an indication from one registered participant to join at least one marketing network of the plurality of marketing networks and update the respective participant record in accordance therewith.

35. The system of claim 34 wherein the indication is received responsive to an invitation to join the at least one marketing network transmitted to the one registered participant by another registered participant belonging to the at least one marketing network.

36. The system of claim 34 further wherein the registration processor is further operative to present, prior to the receipt of the indication, to the one registered participant a list of available marketing networks of the plurality of marketing networks and receive a selection from the one registered participant to join at least one of the available marketing networks.

37. The system of claim 36 wherein the registration processor is further operative to receive, prior to the presentation of the list, from another registered participant belonging to the at least one marketing network, a specification of a subset of other registered participants allowed to join the at least one marketing network, the list of available marketing networks being constrained thereby.

38. The system of claim 24 wherein:
the marketing content processor is further operative to receive second marketing content and second content rules associated therewith from a second registered participant registered in the first participation category, store the second marketing content and second content rules in the database and allow access to the stored second marketing content to at least a second subset of other registered participants of the plurality of registered participants not registered in the first participation category and belonging to a second marketing network of the plurality of marketing networks to which the second registered participant also belongs subject to the second content rules; and wherein
the funding processor is further operative to receive second funding data and second funding rules associated therewith from the second registered participant and store the second funding data and second funding rules in the database, the second funding data specifying second funds available to at least indirectly fund at least a portion of at least one of the plurality of marketing activities by at least one registered participant of the second subset of other registered participants with respect to the second marketing content subject to the second funding rules.

39. The system of claim 38 wherein the first subset of other registered participants is different from the second subset of other registered participants.

40. The system of claim 24 further comprising a campaign processor operative to conduct at least one advertising campaign, and wherein the first marketing content comprises marketing collateral for an advertising campaign to present the first marketing content to one or more consumers, the campaign to be conducted by the campaign processor via electronic mail, postal mail, by telephone, via a web page, or a combination thereof.

41. The system of claim 40 wherein the campaign processor is further operative to execute the advertising campaign to present the first marketing content to the one or more consumers on behalf of at least one of the registered participants belonging to the first marketing network.

42. The system of claim 41 wherein the first content rules specify an extent to which the at least one registered participant is allowed to modify the first marketing content prior to the execution, and wherein the campaign processor is further operative to mediate modification of the first marketing content in accordance with the first content rules to allow or prevent modification thereof prior to the executing.

43. The system of claim 41 wherein the campaign processor is further operative to evaluate, subsequent to the execution, results of the advertising campaign and allow access to the evaluation to the first registered participant.

44. The system of claim 41 wherein the execution of the advertising campaign is characterized by a cost and further wherein the first funding data comprises a first allocation of the first funds to an account associated with the third participant, the first funding rules associated therewith specifying an extent to which the at least one of the associated first subset of the plurality of participants may be entitled to at least a portion of the first allocation of funds to cover at least a portion of the cost of the execution of the advertising campaign.

45. The system of claim 24 wherein the first content rules define at least an extent to which the first marketing content may be modified by a registered participant of the first subset of other registered participants, a duration for which the first marketing content may be exclusively accessed by a registered participant of the first subset of other registered participants, a cost to purchase the first marketing content by a registered participant of the first subset of other registered participants, or a combination thereof.

46. The system of claim 24 wherein the first funding rules define at least one condition upon which at least a portion of the first funds may be provided to a registered participant of the first subset of other registered participants to fund the at least one of the plurality of marketing activities with respect to the first marketing content.

47. A system for facilitating centralized management, by a marketing system, of a plurality of marketing activities among a plurality of participants of a plurality of marketing networks, the plurality of marketing activities comprising at least a determination of one or more consumers to which marketing content is to be presented and a provision of marketing content thereto, the system comprising a processor and a memory coupled therewith, the system further comprising:

first logic stored in the memory and executable by the processor to register each of the plurality of participants with the marketing system as being in one of a first participation category or a second participation category, wherein a participant registered in the first participation category comprises an originator of one or more products or services for sale to the one or more consumers and a participant registered in the second participation category comprises a reseller of the one or more products or services to at least a subset of the one or more consumers;

a database stored in the memory coupled with the first logic and operative to store a plurality of participant records, each of the plurality of participant records being associated with one of the plurality of registered participants and storing participant data characterizing the associated participant as being registered in one of the first or second participation categories, each of the plurality of participant records further storing network data indicative of the associated participant belonging to at least one marketing network of the plurality of marketing networks;

second logic stored in the memory and executable by the processor to receive first marketing content and first content rules associated therewith from a first registered participant registered in the first participation category, store the first marketing content and first content rules in the database and allow access to the stored first marketing content to at least a first subset of other registered participants of the plurality of registered participants not registered in the first participation category and belonging to a first marketing network of the plurality of marketing networks to which the first registered participant also belongs subject to the first content rules; and third logic stored in the memory and executable by the processor to receive first funding data and first funding rules associated therewith from the first registered participant and store the first funding data and first funding rules in the database, the first funding data specifying first funds available to at least indirectly fund at least a portion of at least one of the plurality of marketing activities by at least one registered participant of the first subset of other registered participants with respect to the first marketing content subject to the first funding rules.

48. A system for facilitating centralized management, by a marketing system, of a plurality of marketing activities among a plurality of participants of a plurality of marketing networks, the plurality of marketing activities comprising at least a determination of one or more consumers to which marketing content is to be presented and a provision of marketing content thereto, the system comprising:

means for registering each of the plurality of participants with the marketing system as being in one of a first participation category or a second participation category, wherein a participant registered in the first participation category comprises an originator of one or more products or services for sale to the one or more consumers and a participant registered in the second participation category comprises a reseller of the one or more products or services to at least a subset of the one or more consumers;

means for storing a plurality of participant records, each of the plurality of participant records being associated with one of the plurality of registered participants and storing participant data characterizing the associated participant as being registered in one of the first or second participation categories, each of the plurality of participant records further storing network data indicative of the associated participant belonging to at least one marketing network of the plurality of marketing networks;

means for receiving first marketing content and first content rules associated therewith from a first registered participant registered in the first participation category, storing the first marketing content and first content rules in the storing means and allowing access to the stored first marketing content to at least a first subset of other registered participants of the plurality of registered participants not registered in the first participation category and belonging to a first marketing network of the plurality of marketing networks to which the first registered participant also belongs subject to the first content rules; and means for receiving first funding data and first funding rules associated therewith from the first registered participant and storing the first funding data and first funding rules in the storing means, the first funding data specifying first funds available to at least indirectly fund at least a portion of at least one of the plurality of marketing activities by at least one registered participant of the first subset of other registered participants with respect to the first marketing content subject to the first funding rules.

* * * * *